United States Patent [19]
Henkel

[11] Patent Number: 5,538,323
[45] Date of Patent: Jul. 23, 1996

[54] NECK REST FOR AN AUTOMOBILE SEAT

[76] Inventor: James O. Henkel, 318 Iowa Ave., P.O. Box 354, Stratton, Colo. 80836

[21] Appl. No.: 385,595

[22] Filed: Feb. 8, 1995

[51] Int. Cl.6 ........................................ A47C 7/38
[52] U.S. Cl. ............................ 297/397; 5/490; 5/639; 297/220
[58] Field of Search ........................ 297/397, 220; 5/490, 491, 639, 640

[56] References Cited

U.S. PATENT DOCUMENTS

| 4,165,125 | 8/1979 | Owen | 297/397 X |
| 4,725,094 | 2/1988 | Greer | 297/220 X |
| 4,864,668 | 9/1989 | Crisp | 5/490 X |
| 4,877,288 | 10/1989 | Lee | 297/220 X |
| 4,959,880 | 10/1990 | Tesch | 5/490 X |
| 5,240,330 | 8/1993 | Thompson | 297/397 X |

FOREIGN PATENT DOCUMENTS 448358  6/1936  United Kingdom .................. 297/397

*Primary Examiner*—Peter R. Brown

[57] ABSTRACT

A neck rest for an automobile seat comprised of an attachment portion having an open first end and an open second end. The open first end has an elastic band secured therein surrounding a periphery thereof. The open first end is dimensioned to be positioned over a headrest portion of a car seat. The device contains a flexible extension portion having an open first end and an open second end. The open first end is integral with the open second end of the attachment portion. The device contains a cushion portion having an open first end, a closed second end, and an intermediate extent therebetween. The open first end is integral with the open second end of the flexible extension portion. The intermediate extent has a moldable pillow secured therein. The cushion portion is positionable against the headrest of the car seat.

1 Claim, 4 Drawing Sheets

NECK REST FOR AN AUTOMOBILE SEAT

BACKGROUND OF THE INVENTION

1. Field of the Invention

The present invention relates to a neck rest for an automobile seat and more particularly pertains to providing a driver or a passenger with added neck comfort and support with a neck rest for an automobile seat.

2. Description of the Prior Art

The use of head rests is known in the prior art. More specifically, head rests heretofore devised and utilized for the purpose of enabling an adjustment of the head rest are known to consist basically of familiar, expected and obvious structural configurations, notwithstanding the myriad of designs encompassed by the crowded prior art which have been developed for the fulfillment of countless objectives and requirements.

By way of example, U.S. Pat. No Des. 296,855 to Belk discloses the ornamental design for a vehicle seat head rest.

U.S. Pat. No. 4,589,698 to Suzuki discloses a head-rest device for a vehicle seat.

U.S. Pat. No. 4,411,470 to Nishimura et al. discloses a supporting device of a head rest for a vehicle seat.

U.S. Pat. No. 3,706,472 to Mertens discloses a head rest with energy absorbing heat pad, particularly for vehicle seats.

U.S. Pat. No. 3,572,834 to Herzer et al. discloses an adjustable head rest for vehicle seats.

While these devices fulfill their respective, particular objective and requirements, the aforementioned patents do not describe a neck rest for an automobile seat for providing a driver or a passenger with added neck comfort and support.

In this respect, the neck rest for an automobile seat according to the present invention substantially departs from the conventional concepts and designs of the prior art, and in doing so provides an apparatus primarily developed for the purpose of providing a driver or a passenger with added neck comfort and support.

Therefore, it can be appreciated that there exists a continuing need for new and improved neck rest for an automobile seat which can be used for providing a driver or a passenger with added neck comfort and support. In this regard, the present invention substantially fulfills this need.

SUMMARY OF THE INVENTION

In the view of the foregoing disadvantages inherent in the known types of head rests now present in the prior art, the present invention provides an improved neck rest for an automobile seat. As such, the general purpose of the present invention, which will be described subsequently in greater detail, is to provide a new and improved neck rest for an automobile seat and method which has all the advantages of the prior art and none of the disadvantages.

To attain this, the present invention essentially comprises a car seat having an upper portion. The upper portion has a headrest portion extending vertically therefrom. The headrest provides a place for a user to rest their head against while in a car. The device contains an attachment portion having an open first end and an open second end. The open first end has an elastic band secured therein surrounding a periphery thereof. The open first end is dimensioned to be positioned over the headrest portion of the car seat. The device contains a flexible extension portion having an open first end and an open second end. The open first end is integral with the open second end of the attachment portion. The device contains a cushion portion having an open first end, a closed second end, and an intermediate extent therebetween. The open first end is integral with the open second end of the flexible extension portion. The intermediate extent has a moldable pillow secured therein. The cushion portion is positionable against the headrest of the car seat in a forward position against the headrest providing support for a user' head and neck and is positionable behind the headrest for a user who doesn't require added support.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved neck rest for an automobile seat which has all the advantages of the prior art head rests and none of the disadvantages.

It is another object of the present invention to provide a new and improved neck rest for an automobile seat which may be easily and efficiently manufactured and marketed.

It is a further object of the present invention to provide a new and improved neck rest for an automobile seat which is of durable and reliable construction.

An even further object of the present invention is to provide a new and improved neck rest for an automobile seat which is susceptible of a low cost of manufacture with regard to both materials and labor, and which accordingly is then susceptible of low prices of sale to the consuming public, thereby making such a neck rest for an automobile seat economically available to the buying public.

Still yet another object of the present invention is to provide a new and improved neck rest for an automobile seat which provides in the apparatuses and methods of the prior art some of the advantages thereof, while simultaneously overcoming some of the disadvantages normally associated therewith.

Even still another object of the present invention is to provide a new and improved neck rest for an automobile seat for providing a driver or a passenger with added neck comfort and support.

Lastly, it is an object of the present invention to provide a new and improved neck rest for an automobile seat comprised of an attachment portion having an open first end and an open second end. The open first end has an elastic band secured therein surrounding a periphery thereof. The open first end is dimensioned to be positioned over a headrest portion of a car seat. The device contains a flexible extension portion having an open first end and an open second end. The open first end is integral with the open second end of the attachment portion. The device contains a cushion portion having an open first end, a closed second end, and an intermediate extent therebetween. The open first end is integral with the open second end of the flexible extension portion. The intermediate extent has a moldable pillow secured therein. The cushion portion is positionable against the headrest of the car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
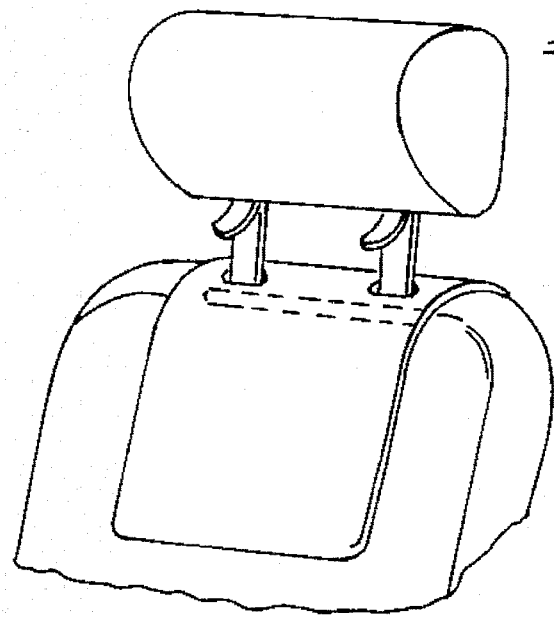
FIG. 1 is a perspective view of the prior art adjustable head rest for vehicle seats.
Figure 2:
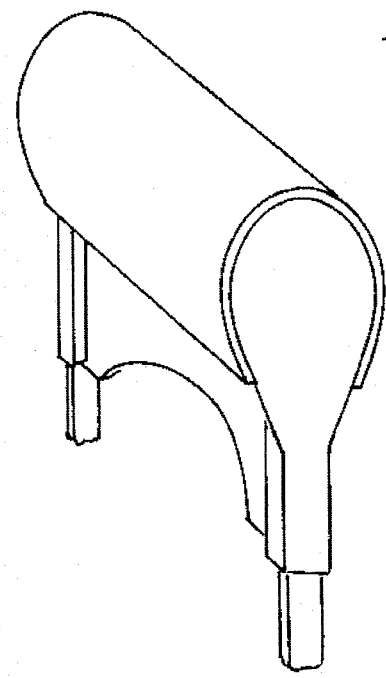
FIG. 2 is an interior frame structure of the prior art head rest with energy absorbing heat pad, particularly for vehicle seats.
Figure 3:
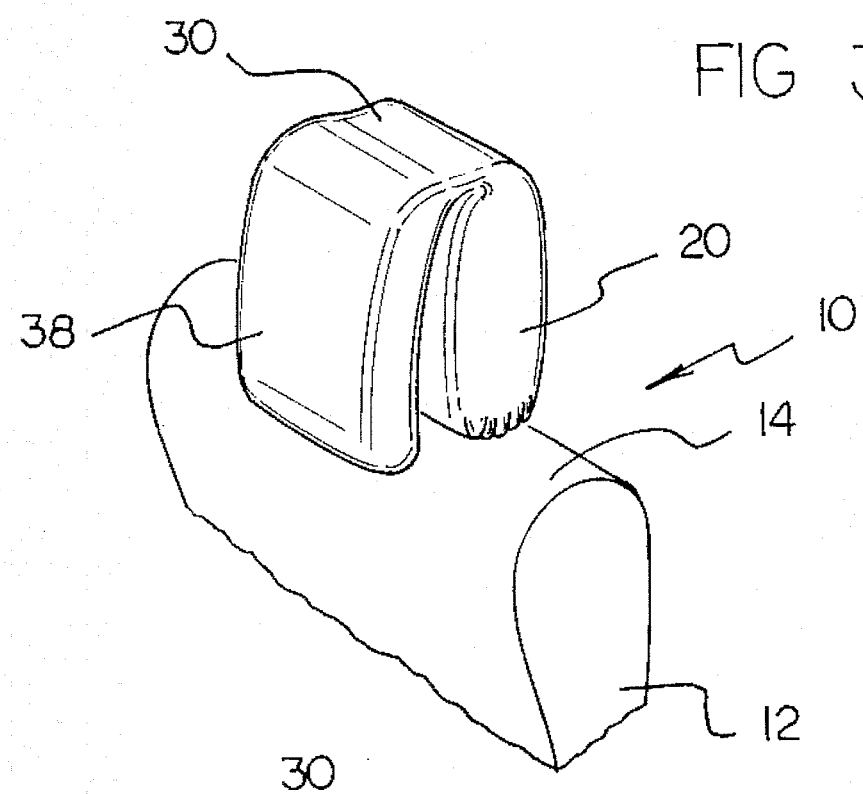
FIG. 3 is a perspective view of the present invention illustrated in place on a vehicle's seat.
Figure 4:
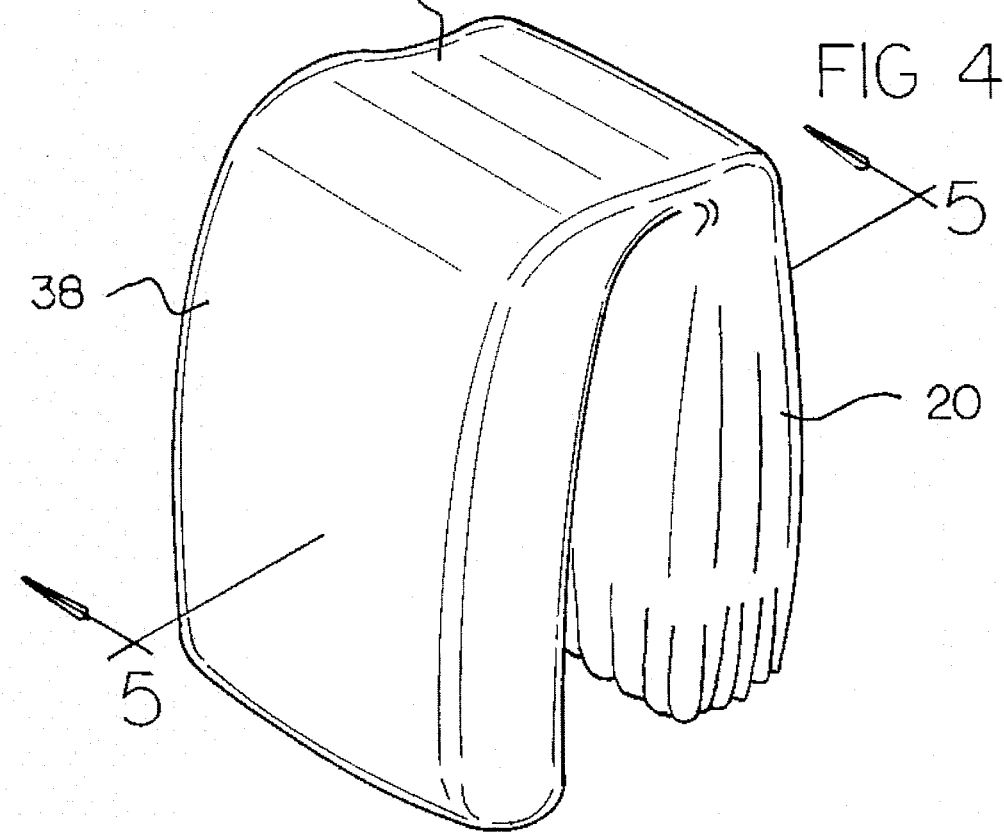
FIG. 4 is a perspective view of the preferred embodiment of the neck rest for an automobile seat constructed in accordance with the principles of the present invention.
Figure 5:
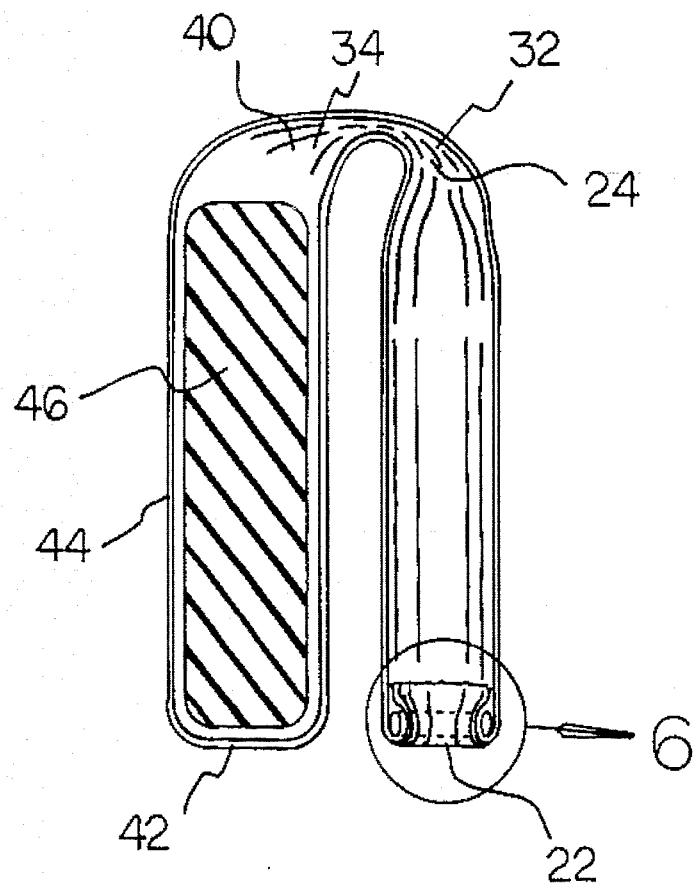
FIG. 5 is a cross-sectional view of the present invention as taken along line 5—5 of FIG. 4.
Figure 6:
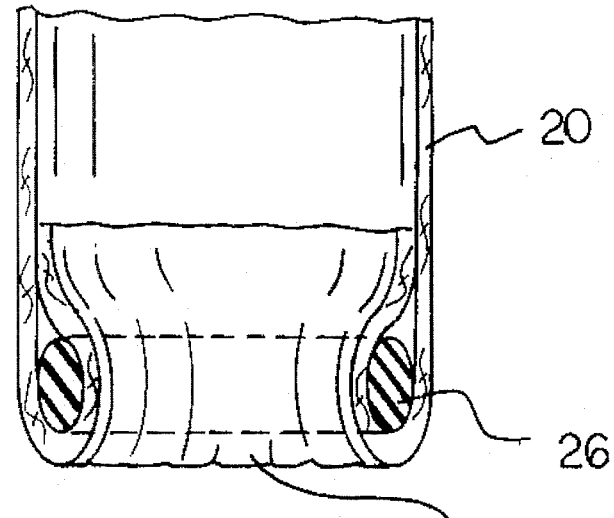
FIG. 6 is an enlarged fragmentary view of the elastic lower end of the attachment portion as taken from FIG. 5.
Figure 7:
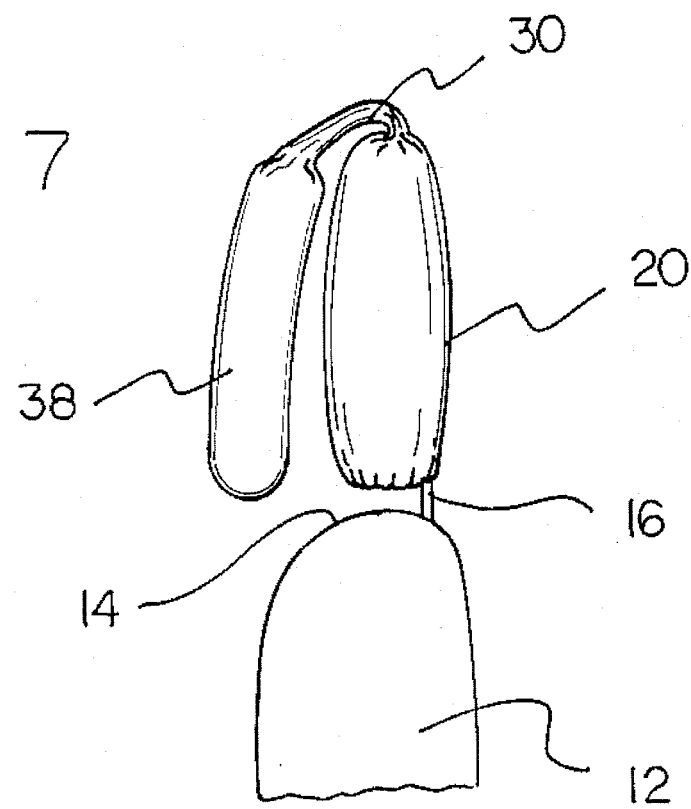
FIG. 7 is a side elevation view of the present invention in the forward position.
Figure 8:
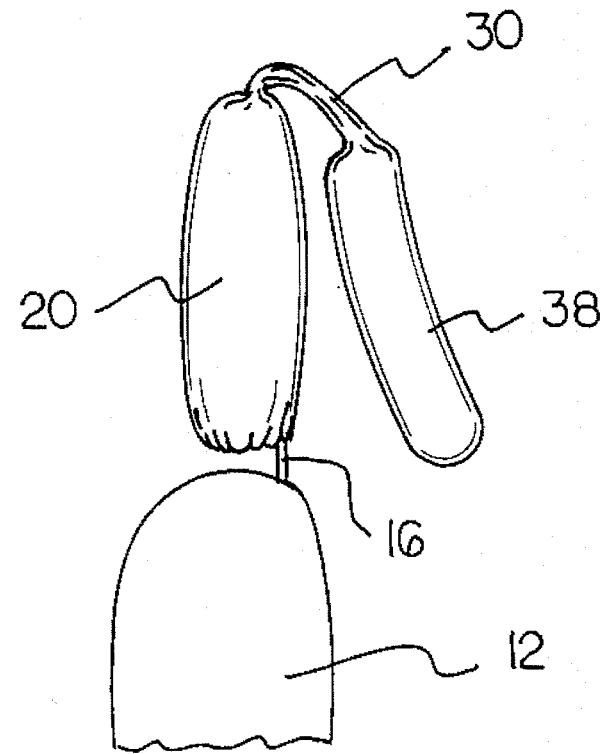
FIG. 8 is a side elevation view of the present invention in the back position.

With reference now to the drawings, and in particular, to FIG. 1 thereof, the preferred embodiment of the new and improved neck rest for an automobile seat embodying the principles and concepts of the present invention and generally designated by the reference number 10 will be described.

Specifically, it will be noted in the various Figures that the device relates to a new and improved neck rest for an automobile seat for providing a driver or a passenger with added neck comfort and support. In its broadest context, the device consists of a car seat headrest, an attachment portion, a flexible extension portion, and a cushion portion.

The device 10 contains a car seat 12 having an upper portion 14. The upper portion 14 has a headrest portion 16 extending vertically therefrom. The headrest 16 provides a place for a user to rest their head against while in a car.

The device 10 contains an attachment portion 20 having an open first end 22 and an open second end 24. The open first end 22 has an elastic band 26 secured therein surrounding a periphery thereof. The open first end 22 is dimensioned to be positioned over the headrest portion 16 of the car seat 12.

The device 10 contains a flexible extension portion 30 having an open first end 32 and an open second end 34. The open first end 32 is integral with the open second end 24 of the attachment portion 20.

The device 10 contains a cushion portion 38 having an open first end 40, a closed second end 42, and an intermediate extent 44 therebetween. The open first end 40 is integral with the open second end 34 of the flexible extension portion 30. The intermediate extent 44 has a moldable pillow 46 secured therein. The moldable pillow 46 is of a similar dimension as the headrest 16. The cushion portion 38 is positionable against the headrest 16 of the car seat 12 in a forward position against the headrest 16 providing support for a user' head and neck and is positionable behind the headrest 16 for a user who doesn't require added support. The flexible extension portion 30 allows for the easy transition from the forward position to the back position. The cushion portion 38 has similar dimensions to the attachment portion 20.

The present invention is a cushioned attachment which is placed upon the headrest 16 of an automobile seat 12, providing the driver and/or passengers with added neck comfort and support.

Approximately eight inches in width and twelve inches in length, this device 10 consists of a sock-like attachment portion 20 with an elastic opening designed to fit over the headrest 16 of the automobile seat 12. Within this attachment is a cushioned, moldable pillow 46 which can be repositioned for a comfortable fit and individualized support along the neck and head area. This unit could be produced from a soft, cotton material, in a variety of colors and designs, and manufactured in a variety of styles for use without any model automobile.

The device 10 is positioned over the headrest 16 of the automobile seat 12 by stretching the elastic bottom over the seat top. According to the needs of the user, the inner, cushioned pillow 46 is then maneuvered within the device 10 so that it provides comfortable and effective support to the individual's neck and head area. Once in place, this pillow 46 will not become dislodged until manually moved by the user. When not in use, this inner pillow 46 is flipped over the top of the headrest 16, out of the way of the user. As needed, this unit is easily removed for convenient cleaning.

This simple and practical device 10 may be used within any style automobile and positioned upon the headrest 16 of any seat 12, providing comfort and support to the driver as well as the passengers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A neck rest for an automobile seat for providing a driver or a passenger with added neck comfort and support comprising, in combination:

a car seat having an upper portion, the upper portion having a headrest portion extending vertically therefrom, the headrest providing a place for a user to rest their head against while in a car;

an attachment portion having an open first end and an open second end, the open first end having an elastic band secured therein surrounding a periphery thereof, the open first end dimensioned to be positioned over the headrest portion of the car seat;

a flexible extension portion having an open first end and an open second end, the open first end being integral with the open second end of the attachment portion;

a cushion portion having an open first end, a closed second end, and an intermediate extent therebetween, the open first end being integral with the open second end of the flexible extension portion, the intermediate extent having a moldable pillow secured therein, the cushion portion positionable against the headrest of the car seat in a forward position against the headrest providing support for a user' head and neck and positionable behind the headrest for a user who doesn't require added support.

* * * * *